United States Patent
More et al.

(10) Patent No.: US 11,597,536 B2
(45) Date of Patent: Mar. 7, 2023

(54) ASSET UTILIZATION MANAGEMENT FOR AIRCRAFT GROUND REFUELING EQUIPMENT

(71) Applicant: Eaton Intelligent Power Limited, Dublin (IE)

(72) Inventors: Parag More, Pune (IN); Jaspal Rawat, Irvine, CA (US); Chandrashekhar Nehete, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 274 days.

(21) Appl. No.: 16/999,288

(22) Filed: Aug. 21, 2020

(65) Prior Publication Data

US 2021/0053700 A1    Feb. 25, 2021

Related U.S. Application Data

(60) Provisional application No. 62/890,136, filed on Aug. 22, 2019.

(51) Int. Cl.
*G06Q 10/00*    (2012.01)
*B64F 5/60*    (2017.01)
(Continued)

(52) U.S. Cl.
CPC .................. *B64F 5/60* (2017.01); *B64F 1/28* (2013.01); *G06K 7/10366* (2013.01);
(Continued)

(58) Field of Classification Search
CPC ........... B64F 5/60; B64F 1/28; G06K 7/1417; G06Q 10/20; G06Q 10/087
(Continued)

(56) References Cited

U.S. PATENT DOCUMENTS

| 7,551,086 B2 | 6/2009 | Coop et al. |
| 8,935,286 B1 | 1/2015 | Westerman, Jr. et al. |

(Continued)

FOREIGN PATENT DOCUMENTS

| CN | 105260816 B | 6/2019 |
| EP | 2 839 885 A1 | 2/2015 |

(Continued)

OTHER PUBLICATIONS

Extended European Search Report for Application No. 20192035.2 dated Oct. 20, 2020.

(Continued)

*Primary Examiner* — Toan C Ly
(74) *Attorney, Agent, or Firm* — Merchant & Gould P.C.

(57) ABSTRACT

A system for monitoring components of an aircraft ground refueling system includes a first computing device and a second computing device hosting a data base. The first computing device is caused to read a component identification tag secured to a component of an aircraft ground refueling system; the tag contains a unique component identifier. The first computing device transmits the component identifier to the second computing device which verifies that the component identifier is active in the data. The first computer, responsive to the verification, displays a user interface to receive data representative of an operational status of the component and transmits the operational status. The second computing device stores the data in the database to create an operational history of the component. The second computing device analyzes the history of the data to determine a characteristic operational parameter of the component of the aircraft ground refueling system.

19 Claims, 4 Drawing Sheets

(51) Int. Cl.
    B64F 1/28      (2006.01)
    G06K 7/10      (2006.01)
    G06K 7/14      (2006.01)
    G06Q 10/20     (2023.01)
    G06Q 30/018    (2023.01)
    G06Q 50/06     (2012.01)
(52) U.S. Cl.
    CPC ........... G06K 7/1417 (2013.01); G06Q 10/20 (2013.01); G06Q 30/0185 (2013.01); G06Q 50/06 (2013.01)
(58) Field of Classification Search
    USPC ........................................................ 701/33.4
    See application file for complete search history.

(56) References Cited

U.S. PATENT DOCUMENTS

| | | | |
|---|---|---|---|
| 10,387,808 B1* | 8/2019 | Scott | ............... G06Q 50/06 |
| 2007/0114280 A1 | 5/2007 | Coop et al. | |
| 2016/0221816 A1* | 8/2016 | Pollock | ................. G05B 15/02 |
| 2020/0126401 A1* | 4/2020 | Clevenger | ........ G06K 19/06037 |

FOREIGN PATENT DOCUMENTS

| | | |
|---|---|---|
| EP | 3249585 A1 | 11/2017 |
| GB | 2 328 839 A | 3/1999 |

OTHER PUBLICATIONS

Lampe et al., "The Potential of RFID for Moveable Asset Management," http://www.vs.inf.ethz.ch/publ/papers/lampe03_RFIDAssetManagement.pdf, 4 pages (Dec. 31, 2003).

Object hyperlinking, Wikipedia, http://en wikipedia.org/w/index.php?title=Object_hyperlinking&oldid=412772431, 5 pages (Feb. 8, 2011).

Ollivier, "RFID—A practical solution for problems you didn't even know you had!," IEE Colloquium on Wireless Technology, London, Great Britain, pp. 3/1-3/6 (Nov. 14, 1996).

* cited by examiner

ASSET UTILIZATION MANAGEMENT FOR AIRCRAFT GROUND REFUELING EQUIPMENT

FIELD OF THE DISCLOSURE

The present disclosure is directed to management of components in aircraft ground refueling equipment and, more specifically, to utilizing a unique component identifier to manage field-deployed aircraft ground refueling components.

BACKGROUND

An aircraft ground refueling system includes numerous components such as couplers, valves, meters, transducers, nozzles, controllers and the like that are important to the timely refueling of aircraft while that aircraft is on the ground. However, as with all mechanical and electrical components, the components of a refueling system have the potential to degrade or fail over time due to usage, age or environmental exposure. Failures of aircraft ground refueling components can directly affect the time it takes to refuel an aircraft as well as the quality or volume of fuel supplied to the aircraft. Issues with refueling can directly affect the timeliness of an aircraft departure and can even result in a flight cancellation.

SUMMARY

The Summary is not intended to describe each embodiment or every implementation. A more complete understanding will become apparent and appreciated by referring to the following detailed description and claims in conjunction with the accompanying drawings.

An aspect of the present disclosure is directed to a method for monitoring components of an aircraft ground refueling system. The method includes generating a unique component identification for each one of a plurality of components of an aircraft ground refueling system and tagging each one of the plurality of components with an electronically readable tag containing the unique component identification. The method further comprises deploying each of the tagged components into active use in a specific aircraft ground refueling system as well as storing the unique component identification in a database of a first computing device. The method additionally includes electronically reading at least one of the tags of one of the plurality of components with a second computing device, receiving data reflective of an interaction with the one of the plurality of components at the second computing device, associating the received data with the unique component identification of the one of the plurality of components at the second computing device, and transmitting the unique component identification along with the data from the second computing device to the first computing device. The data is stored in the database at the first computing device in association with the unique component identification and a history of data is analyzed to determine a characteristic operational parameter of the one of the plurality components of the aircraft ground refueling system.

Another aspect of the present disclosure is directed to a system for monitoring components of an aircraft ground refueling system. The system includes a first computing device and a second computing device hosting a data base. The first computing device is caused to read a component identification tag secured to a component of an aircraft ground refueling system; the tag contains a unique component identifier. The first computing device transmits the component identifier to the second computing device which verifies that the component identifier is active in the data. The first computer, responsive to the verification, displays a user interface to receive data representative of an operational status of the component and transmits the operational status. The second computing device stores the data in the database to create an operational history of the component. The second computing device analyzes the history of the data to determine a characteristic operational parameter of the component of the aircraft ground refueling system.

Still another aspect of the present disclosure is directed to a method of deploying a component of an aircraft ground refueling system. The method includes generating a unique component identification for a component of an aircraft ground refueling system, tagging the component with an electronically readable tag containing the unique component identification, and installing the component as an active component in the aircraft ground refueling system. The method further includes electronically reading the tag of the component and transmitting the unique component identification contained in the read tag to a database within data storage of a computing device, determining that the unique component identification does not exist as an active component within the database and, based on the determination, creating a new database entry for the unique component identification as an active component, and associating the new database entry with an existing unique system identification of the aircraft ground refueling system within the database.

DETAILED DESCRIPTION

The present disclosure is directed to collectively tracking ground refueling system components to maintain an active history of each component and to use that history to manage maintenance and replacement of components. Proactively managing maintenance and replacement of system components rather the reactively addressing system component issues as they occur in the field can help to reduce delays in aircraft refueling.

Figure 1:
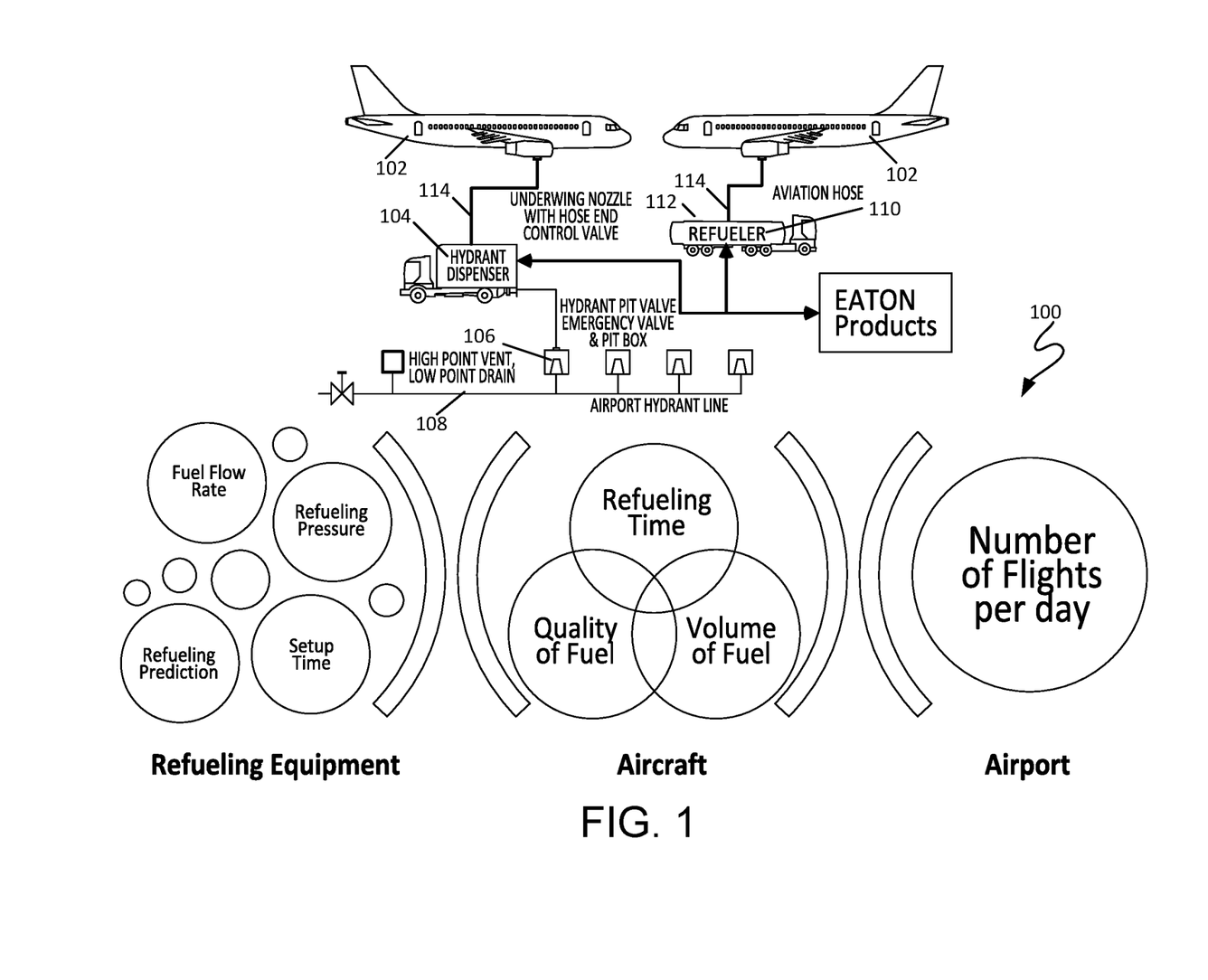
FIG. 1 illustrates an example environment of an aircraft ground refueling operation.

FIG. 1 illustrates an example environment 100 of an aircraft ground refueling operation. As shown aircraft 102 are typically refueled by a mobile hydrant dispenser 104 that is directly coupled, via a hydrant valve 106, to an airport hydrant line 108 or by a mobile refueler 110 that carries all necessary fuel in a tank 112. Each of the mobile hydrant dispenser 104 and mobile refueler 110 are coupled to their respective aircraft via a fuel hose 114.

Figure 2:
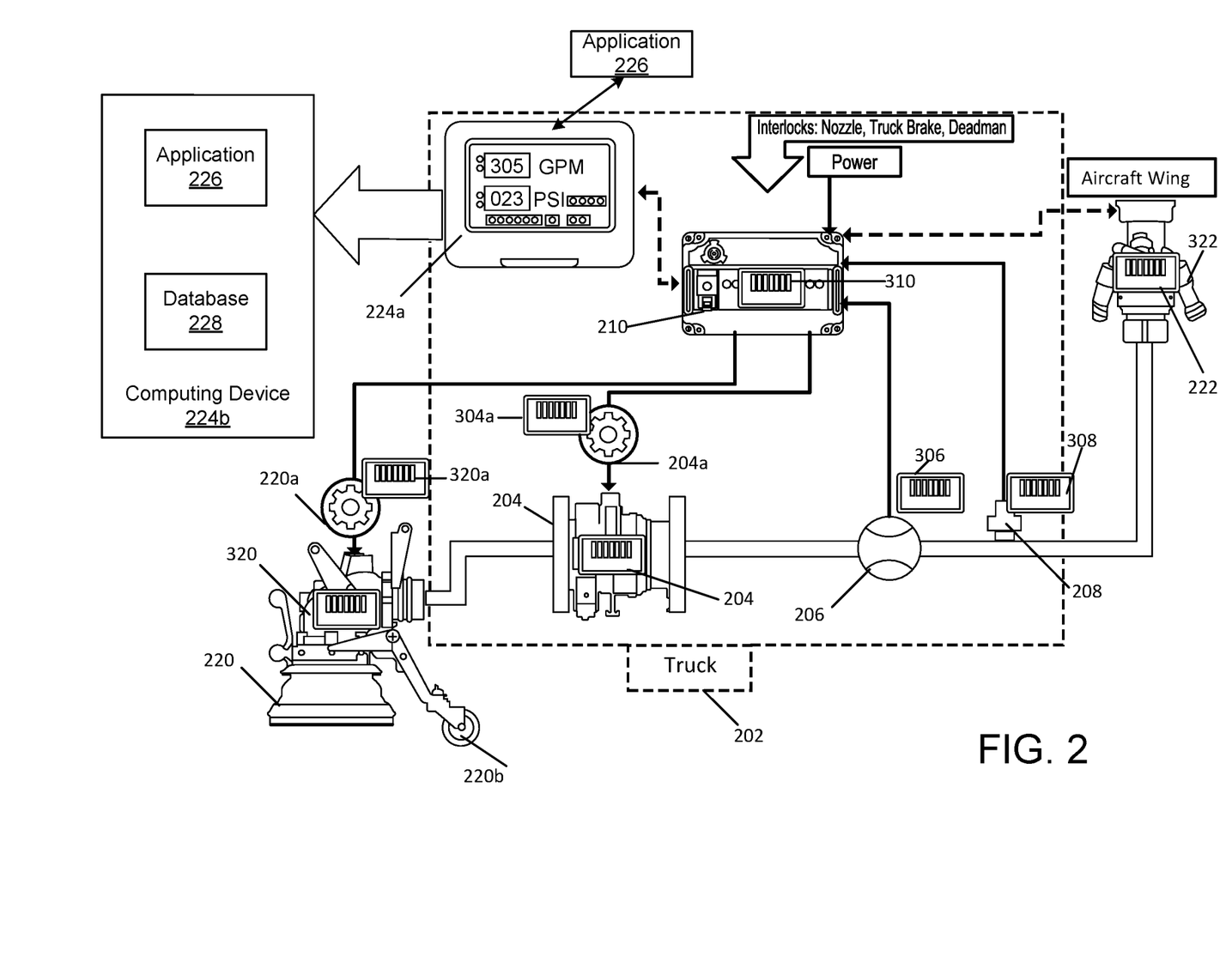
FIG. 2 illustrates an example of an aircraft ground refueling system architecture.

FIG. 2. illustrates an example ground refueling system architecture 200 including system components that reside within the truck 202 (e.g., the mobile hydrant dispenser 104 or mobile refueler 110) and system components that reside outside the truck 202. The system components within the truck 202 include an inline valve 204 along with a motor 204a for driving the valve 204, a flow meter 206, a pressure transducer 208 and a controller 210. The system components outside the truck 202 include a fuel inlet valve 220 along with a motor 220a for driving the fuel inlet valve 220 and a nozzle 222; the fuel inlet valve 220 additionally includes a hydrant coupler 220b. A first computing device 224a, executing one or more applications 226, can be a fixture within the truck 202 or can be a portable device usable within or outside the truck 202. The first computing device 224a is in communication with a second computing device 224b, executing one or more applications 226 and hosting a database 228. In certain embodiments, additional system components are included within or outside the truck 202. In certain embodiments, identified system components are omitted or replaced with other suitable components.

The basic operation of the ground refueling system is as follows. The fuel inlet valve 220, external to the truck 202, is coupled via hydrant coupler 220b to an airfield fuel hydrant line (not shown). The controller 210 provides a signal to the motor 220a to open the fuel inlet valve 220 to provide a desired fuel flow and pressure in the line. The fuel inlet valve 220 is coupled to the inline valve 204 within the truck 202. The controller 210 provides a signal to the motor 204a to further adjust the fuel flow and pressure in the line. The flow meter 206 and the pressure transducer 208 are place in the fuel delivery line prior to the nozzle 222 and provide feedback on flow rate and pressure, respectively, in the line. The controller 210 utilizes the feedback in closed loop control to make adjustments to the valve settings of the fuel inlet valve 220 and the inline valve 204. The nozzle 222 is coupled to the fuel tanks of an aircraft for delivery of fuel. In certain embodiments, the controller 210 transmits system settings to the computing device 224 by wired or wireless transmission. The transmitted system settings can include, for example, the valve settings, the flow in the fuel delivery line (e.g., gallons per minute, GPM), the pressure in the fuel delivery line (e.g., pounds per in.2, PSI), a nozzle pressure and the like.

In accordance with present invention, all, or at least a portion, of the identified ground refueling system components are tagged with a unique component identifier. For example, the inline valve 204 is tagged with component identifier 304, the motor 204a is tagged with component identifier 304a, the flow meter 206 is tagged with component identifier 306, the pressure transducer 208 is tagged with component identifier 308, the controller 210 is tagged with component identifier 310, the fuel inlet valve 220 is tagged with component identifier 320, the motor 220a is tagged with component identifier 320a, and nozzle 222 is tagged with component identifier 322. The tagging of the components can occur at the time of manufacture, at the time of deployment or at any time a previously deployed product is visited in the field. The unique component identifier can include data that identifies a type of component (e.g., a valve, a flow meter, etc), a specific ground refueling system with which the component is associated, a location where the component is to be deployed or stored, a date of manufacture or a date deployment, as well as other data relevant to the specific component.

The unique component identifier is any type of identifier that can be read electronically. Reading an identifier electronically can include, for example, detecting a signal transmitted from the identifier, scanning the identifier, obtaining a digital image (e.g., photographing) of the identifier and the like. A reading device can be in the form of a multi-purpose computing device, such as computing device 224, tablet computing device or smart phone, a device dedicated to reading that can store and/or transmit the component identifier to a multi-purpose computing device or any other device the that has the ability to perform one or more of receiving a wired or wireless transmission, scanning, or obtaining a digital image.

In certain embodiments, the component identifier comprises a radio frequency identification (RFID) tag that is secured to the system component. The RFID tag incorporates an integrated circuit and antenna, and can be either passive or active. A passive RFID tag is powered by a wireless reader (e.g., computing device 224) in order to transmit a signal containing component identifier data while an active RFID tag is equipped with its own power supply to continuously transmit a signal containing the component identifier data to a wireless reader. In certain embodiments, the component identifier comprises a barcode tag that is optically scanned, or otherwise digitally imaged, by a reader (e.g., computing device 224). In certain embodiments the component identifier is a smart label, e.g., an encoded and printed on-demand tag that incorporates both RFID and barcode technologies. In certain embodiments, the component identifier includes quick response (QR) code (e.g., a two-dimensional or matrix bar code) tag that is optically scanned, or otherwise digitally imaged such as by a digital photograph, by a reader.

In certain embodiments, the reading obtained by the reader of the component identifier tag includes, not only the component identifier but additional information gained from the surroundings of the component. For example, a reading of the component identifier tag may additionally include a location generated by a GPS function of the reader, a date and/or time generated by calendar/clock function of the reader, current weather conditions generated by a weather application of the reader and the like.

As noted earlier, in certain example embodiments, the component identifier tag incorporates not only a unique identifier for the component itself but additionally includes a system identifier. The system identifier is representative of a common location in which a plurality of ground refueling system components are found. The common location represented by the system identifier can comprise, for example, a truck (e.g., truck 202) in which all components are located and comprise an element of a functioning ground refueling system, a storage facility in which spare components are housed, or an airfield facility where components external to the truck 202 are deployed/used. In certain embodiments, the system identifier is established during manufacture and incorporated into the tag itself to pre-associate components destined for a common location. In certain embodiments, the system identifier is not incorporated into the actual component identifier tag but, rather, is associated with a component identifier during or after deployment of the component in the field via a database association (further details on database provided below). In certain embodiments, the component identifier tag is replaced in the field with an updated component identifier tag that includes a new or different system identifier.

The application 226 executed by the computing device 224 is used to receive the readings of each of the component identifier tags (and any other data provided with the reading that is generated by reader) and store them in the database 228. Each reading of a component identifier tag can be used to establish a new component identifier within the database if it does not already exist, or, if already existing, a date of the reading of the component identifier tag, can be used to indicate an operational status of the component (e.g. fully functioning, degrading, requiring maintenance, failure, etc.) or an interaction with the component (e.g. a maintenance check interaction, a repair interaction, a deployment interaction, etc.). A determination as to what a reading of the component identifier tag will represent can be established within the application 226 through application defaults or user-selected preference.

The application 226 operates to associate, within the database 228, the component identifier tag with additional data already stored in the database 228 and relevant to the component itself. For example, the component identifier can be associated with a ground refueling system identification, a system name and a system location. The component identifier can also be associated with a component name, with a component date of manufacture, with acceptance test data, with a component storage date and location, with a component field deployment date and location, with a component maintenance type and date, with a component repair type and date, with a component failure type and date, with notes pertinent to the component or with any other type of information relevant to the life of the component. The component identifier and all, or at least a portion, of the data that is stored in the database 228 and associated with the component identifier can be displayed via a user-interface of a display device in communication with the computing device 224. In certain embodiments, the application includes a user-interface that can display all, or at least a portion of, the components associated with a specific system identification or the components located at a common location. Other user-interface displays are also possible.

In certain embodiments, a reading of the component identifier tag prompts the application 226 to present a user-interface display on the reader through which a technician can enter data relevant to the operating status or condition of the component, or any other data pertinent to the component. The technician-entered data can be stored locally on the reader then transmitted/downloaded to the database 228 or transmitted immediately for use by the application 226.

In certain embodiments, the application 226 includes an analysis module that operates on current and historical component data stored in the database 228 to determine a characteristic operational parameter of a component. The characteristic operational parameter can include, for example, a calibration schedule for the components, a maintenance schedule for component, a remaining useful life of a component, a degradation rate of a component and the like. In certain embodiments, the analysis module of the application additionally considers data provided by the controller 210, such as valve positions, flow rates, line pressures and the like in making one or more of the determinations. The application 226 additionally generates one or more user-interfaces for displaying the results of the one or more determinations in graphical and/or text form. In certain embodiments, the application 226 is additionally used as a tool for tracking order and installation of replacement components via component identification.

Figure 3:
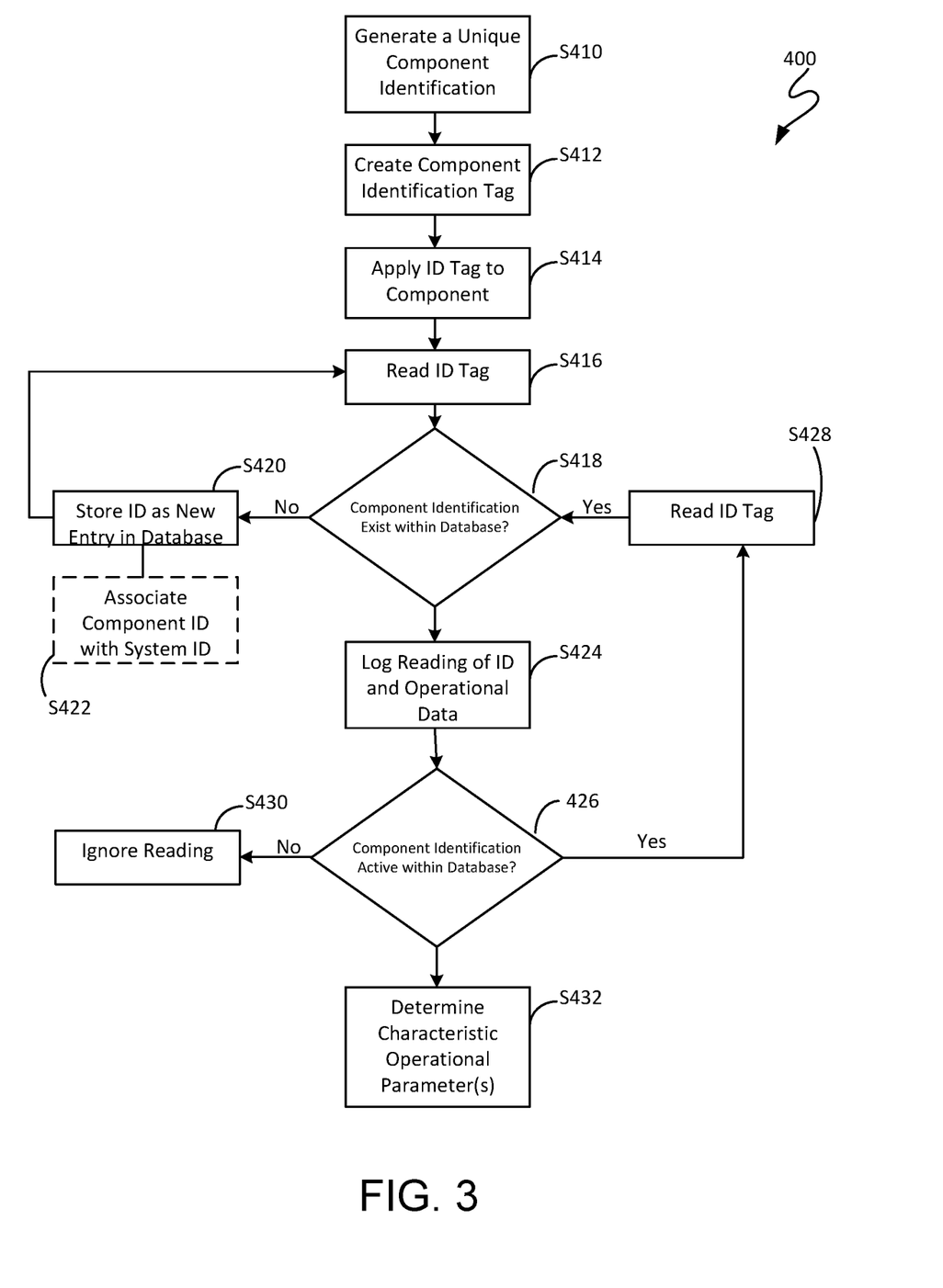
FIG. 3 is a flowchart illustrating a method for monitoring aircraft ground refueling system components.

Referring to FIG. 3 a method for monitoring components of an aircraft ground refueling system is illustrated. As shown, the method 400 includes generating a unique component identification, S410 and creating a component identification tag that incorporates the unique component identification, S412. Subsequently, the component identification tag is applied to a component of an aircraft ground refueling system during manufacture (or when the component is deployed in the field), S414. The component identification tag is then read by a reader, S416, and based on the reading, a determination is made as to whether the component identification exists within an aircraft ground refueling system database, S418. If the component identification does not exist within the database, S418:NO, the component identification is stored as a new component identification within the database, S420 and, if appropriate, associated with a ground refueling system identification (which may be contained within the component identification or entered manually), S422.

If the component identification does exist within the database, S418:YES, the reading of the component identification tag is logged within the database along with component operational data, e.g., a maintenance check or other type of interaction with the component (e.g., the type of interaction may be selected by the user through, for example, a drop-down selection menu), S424. Additional data related to the reading can also be entered and stored in association component identification in the database at this time. While the component identification remains active in the database, S426:YES, continued readings of the component identification tag are stored in the database to create a history of the component, S428. If the component identification is no longer active within the database (e.g., the component has been removed or will be removed from use), S426:NO, any readings of the component identification tag are ignored, S430. Finally, analysis can be performed, S432, on the component data within the database to recognize trends in data that can be used to determine a characteristic operational parameter, for example, a calibration schedule for a components, a maintenances schedule for a component, a remaining useful life of a component, a degradation rate of a component and the like.

The method of FIG. 3 is but one example of a method for monitoring components of an aircraft ground refueling system. It will be appreciated by one skilled in the art that steps may be added or removed from the method as suitable to a particular application. Further, it should be noted that, while the steps are illustrated as occurring in a certain order, the steps may be executed in any order suitable to a particular application.

Figure 4:
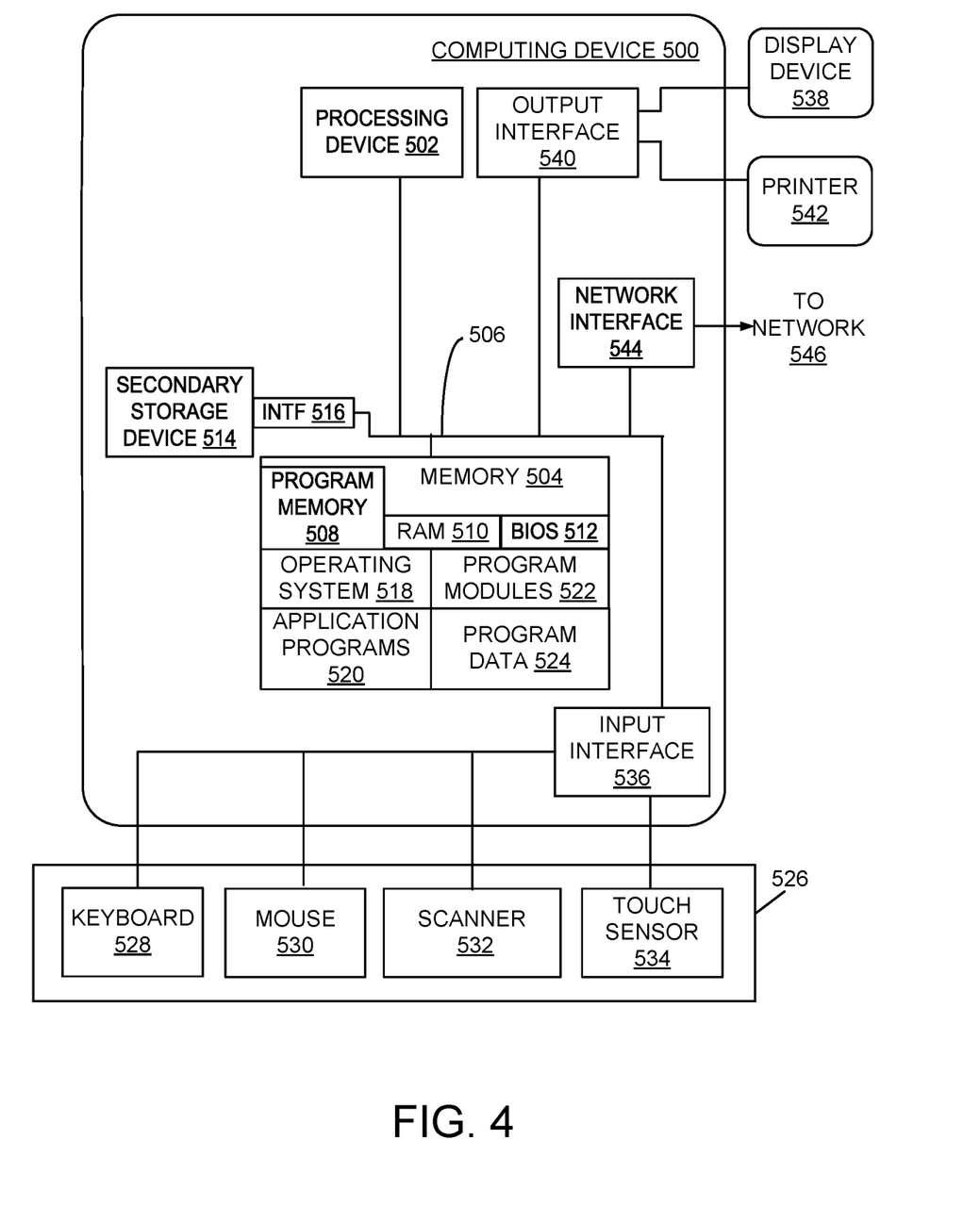
FIG. 4 illustrates an example computing device.

FIG. 4 illustrates an exemplary architecture of a computing device 500 that can be used to implement aspects of the present disclosure including the computing device 224/reader. The computing device 500 can be in any suitable form including a microcontroller, a microprocessor, a desktop computer, a laptop computer, a tablet computer, a mobile computing device (e.g., smart phone, iPod™, iPad™, or other mobile device) or other device configured to process digital instructions. The exemplary computing device 500 may be configured specific to its intended use incorporating various peripherals and programming instructions, as described herein, to achieve desired operations. Further, it is understood that the computing device 500 is an example of programmable electronics, which may include one or more such computing devices, and when multiple computing devices are included, such computing devices can be coupled together with a suitable data communication network so as to collectively perform the various functions, methods and operations disclosed herein.

In general terms, the computing device 500 includes at least one processing device and at least one computer readable storage device. The processing device operates to execute data instructions stored in the computer readable storage device to perform various operations, methods, or functions described herein.

In more particular terms and with reference to FIG. 4, the computing device 500 includes at least one processing device 502, such as a central processing unit (CPU), as well as a system memory 504 and a system bus 506. The system bus 506 couples various system components including the system memory 504 to the processing device 502. The system bus 506 is one of any number of types of bus structures including a memory bus, a peripheral bus, and a local bus using any variety of bus architectures.

The system memory 504 includes program memory 508 and random access memory (RAM) 510. A basic input/output system (BIOS) 512 containing the basic routines that act to transfer information within the computing device 500, such as during start up, is typically stored in the program memory 508. In some embodiments, the computing device 500 also includes a secondary storage device 514, such as a hard disk drive or file server, for storing digital data. The secondary storage device 514 is connected to the system bus 506 by a secondary storage interface (INTF) 516. The secondary storage device 514, and its associated computer readable media, provides nonvolatile storage of computer readable instructions (including application programs and program modules), data structures, and other data for the computing device 500.

Although the exemplary computing device 500 described herein employs a secondary storage device 514, in some other embodiments the secondary storage device is eliminated or its hard disk drive/file server configuration is replaced with an alternative form of computer readable storage media. Alternative forms of computer readable storage media include, but are not limited to, magnetic cassettes, flash memory cards, digital video disks, Bernoulli cartridges, compact disc memories, digital versatile disk memories, and random access memories. Some embodiments of the secondary storage devices 514 include non-transitory media. Further, the computer readable storage media can include local storage or cloud-based storage.

A number of program modules can be stored in the memory 504, or the secondary storage device 514. These program modules include an operating system 518, one or more application programs 520, other program modules 522 as described herein, and program data 524. The computing device 500 can utilize any suitable operating system, such as Microsoft Windows™, Google Chrome™, Apple OS, and any other operating system suitable for a computing device.

The computing device 500 typically includes at least some form of computer readable media, e.g., computer readable media within the memory 504 or secondary storage device 514. Computer readable media includes any available media that can be accessed by the computing device 500. By way of example, computer readable media includes computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 500.

In some embodiments, a user provides inputs to the computing device 500 through one or more input devices 526. Examples of input devices 526 include a keyboard 528, a mouse 530, a camera/scanner 532, and a touch sensor 534 (such as a touchpad or touch sensitive display). In some embodiments, the input devices 526 are incorporated into the computing device 500 itself. In some embodiments, the input devices 526 are external to the computing device 500 and are connected to the processing device 502 through an input interface 536 that is coupled to the system bus 506. The input devices 526 can be connected by any number of input/output interfaces, such as parallel port, serial port, game port, universal serial bus, or a custom interface. Wireless communication between input devices and the input interface 536 is possible as well, and includes infrared, BLUETOOTH® wireless technology, 802.11/a/b/g/n, cellular, or other radio frequency communication systems in some possible embodiments.

In the example embodiment of FIG. 4, the computing device 500 incorporates within or is operably coupled to a display device 538. Examples of the display device 538 include a monitor, a liquid crystal display device, a projector, or a touch sensitive display device. The display device 538 is also connected to the system bus 506 via an output interface 540, such as a display controller. In addition to the display device 538, the computing device 500 can control via output interface 540 various other peripherals such as a printing device 542 or speaker (not shown). As with the input interface 536, the output interface 540 can comprise any number of input/output interfaces such as those described in the paragraph above.

The computing device 500 further includes a network interface 544 that includes a network communication device to communicate digital data across a data communication network 546. An example of the network interface 544 includes a wireless transceiver for transmitting digital data over a wireless network. The wireless transceiver is configured to work with one or more wireless communication technologies such as cellular communication, Wi-Fi communication (such as that conforming to one of the IEEE 802.11 family of communication protocols), Bluetooth® communication, and the like. In other embodiments, the network interface 544 is an Ethernet network interface device having an Ethernet port for receiving an Ethernet cable to transmit and receive digital data across the Ethernet cable to a network 546 such as a local area network or the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed:

1. A method for monitoring components of an aircraft ground refueling system comprising:
generating a unique component identification for each one of a plurality of components of an aircraft ground refueling system;

tagging each one of the plurality of components with an electronically readable tag containing the unique component identification;
deploying each of the tagged components into active use in a specific aircraft ground refueling system;
storing the unique component identification in a database of a first computing device;
electronically reading at least one of the tags of one of the plurality of components with a second computing device;
determining that the unique component identification exists as an inactive component in the database and that the inactive component is identified as a replacement component;
determining that the unique component identification does not exist as an active component within the database and, based on the determination, creating a new database entry for the unique component identification as an active component;
associating the new database entry with an existing unique system identification of the aircraft ground refueling system within the database;
receiving data reflective of an interaction with the one of the plurality of components at the second computing device, associating the received data with the unique component identification of the one of the plurality of components at the second computing device, and transmitting the unique component identification along with the data from the second computing device to the first computing device;
storing the data in the database at the first computing device in association with the unique component identification;
analyzing the data in the database to determine a characteristic operational parameter of the one of the plurality components of the aircraft ground refueling system.

2. The method of claim 1, further comprising generating a unique system identification for the specific aircraft ground refueling system and associating the unique system identification with each of the tagged components.

3. The method of claim 1, wherein the unique component identification of the electronically readable tag is in the form of at least one of: a bar code, a radio frequency identification (RFID) code, and a quick response (QR) code.

4. The method of claim 1, wherein the characteristic operational parameter comprises at least one of: a calibration schedule for the one of the plurality components, a maintenance schedule for the one of the plurality components, a remaining useful life for the one of the plurality components, and a degradation rate the one of the plurality components.

5. The method of claim 1, wherein electronically reading the at least one of the tags includes: scanning the at least one of the tags, obtaining an electronic image the at least one of the tags, and receiving a wireless transmission from the at least one of the tags.

6. The method of claim 1, wherein the at least one component comprises at least one of: a fuel inlet valve, an inline valve, a flow meter, a pressure transducer, a nozzle and a system controller.

7. A system for monitoring components of an aircraft ground refueling system comprising:
a first computing device executing instructions stored in a first memory and a second computing device executing instructions stored in a second memory, the second computing device hosting a database,
wherein the first computing device is caused to:
read a component identification tag secured to a component of an aircraft ground refueling system, wherein the component identification tag contains a unique component identifier of the component;
transmit the component identifier to the second computing device;
determine that the unique component identification exists as an inactive component in the database and that the inactive component is identified as a replacement component;
determine that the unique component identification does not exist as an active component within the database and, based on the determination, create a new database entry for the unique component identification as an active component;
associate the new database entry with an existing unique system identification of the aircraft ground refueling system within the database;
receive, responsive to the transmission of the component identifier, a notification from the second computing regarding the component identifier;
display, responsive to the notification, a user-interface to receive data reflective of an operational status of the component and transmit the data to the second computing device for storage in the database in association with the component identifier;
wherein the second computing device is caused to:
analyze a history of the data associated with the component identifier to determine a characteristic operational parameter of the component of the aircraft ground refueling system.

8. The system of claim 7, wherein the second computing device is further caused to transmit to the first computing device and the characteristic operational parameter and wherein the first computing device is further caused to display the characteristic operational parameter.

9. The system of claim 7, wherein the unique component identifier of the component identification tag is in the form of at least one of: a bar code, a radio frequency identification (RFID) code, and a quick response (QR) code.

10. The system of claim 7, wherein the component identification tag additionally includes a unique system identifier identifying a specific aircraft ground refueling system in which the component is deployed.

11. The system of claim 7, wherein the characteristic operational parameter comprises at least one of: a calibration schedule for the one of the plurality components, a maintenance schedule for the one of the plurality components, a remaining useful life for the one of the plurality components, and a degradation rate the one of the plurality components.

12. The system of claim 7, wherein the first computing device reads the component identification tag by at least one of: scanning the component identification tag, taking an electronic image of the component identification tag, and receiving a transmission from the component identification tag.

13. The system of claim 7, wherein the component comprises at least one of: a fuel inlet valve, an inline valve, a flow meter, a pressure transducer, a nozzle and a system controller.

14. The system of claim 7, the system further comprising an aircraft ground refueling system controller and wherein an input received from the component at the controller is transmitted to the second computing device.

15. The system of claim 14, wherein the input received from the component is used by the second computing device to determine the characteristic operational parameter.

16. A method of deploying a component of an aircraft ground refueling system, comprising:
- generating a unique component identification for a component of an aircraft ground refueling system;
- tagging the component with an electronically readable tag containing the unique component identification;
- installing the component as an active component in the aircraft ground refueling system;
- electronically reading the tag of the component and transmitting the unique component identification contained in the read tag to a database within data storage of a computing device;
- determining that the unique component identification exists as an inactive component in the database and that the inactive component is identified as a replacement component;
- determining that the unique component identification does not exist as an active component within the database and, based on the determination, creating a new database entry for the unique component identification as an active component;
- associating the new database entry with an existing unique system identification of the aircraft ground refueling system within the database.

17. The method of claim 16, wherein the unique component identification contained within the electronically readable tag is in the form of at least one of: a bar code, a radio frequency identification (RFID) code and a quick response (QR) code.

18. The method of claim 16, wherein the component comprises at least one of: a fuel inlet valve, an inline valve, a flow meter, a pressure transducer, a nozzle and a system controller.

19. The method of claim 16, further comprising reading the tag of the installed component over an extended period of time to establish an operation history of the component, wherein each reading of the tag prompts a display of a user interface for entry of component operational data.

\* \* \* \* \*